United States Patent [19]

Lapeyre

[11] Patent Number: 4,738,004
[45] Date of Patent: Apr. 19, 1988

[54] TUNA BUTCHERING METHOD

[75] Inventor: James M. Lapeyre, New Orleans, La.

[73] Assignee: The Laitram Corporation, New Orleans, La.

[21] Appl. No.: 365,555

[22] Filed: Apr. 5, 1982

[51] Int. Cl.⁴ .................. A22C 25/14; A22C 25/18
[52] U.S. Cl. ........................................ 17/52; 17/54
[58] Field of Search .................... 17/52, 45, 53, 54

[56] References Cited

U.S. PATENT DOCUMENTS

| 2,911,668 | 11/1959 | Johnson | 17/52 |
| 3,460,193 | 8/1969 | Yoshida | 17/52 X |
| 3,593,370 | 7/1971 | Lapeyre | 17/52 |
| 3,800,363 | 4/1974 | Lapeyre | 17/52 |
| 3,916,484 | 11/1975 | Kennedy | 17/52 |

Primary Examiner—Willie G. Abercrombie
Attorney, Agent, or Firm—Weingarten, Schurgin, Gagnebin & Hayes

[57] ABSTRACT

An automated butchering method and system for separating the edible loin portions of transverse tuna slices. Each transverse slice of the principal loin bearing section of a tuna is viewed or scanned to produce electrical signals representative of the boundary between the edible loin portions and the contiguous waste meat portions. Control signals can be derived from these electrical signals for government of cutting apparatus for precise separation of the edible loin portions along the detected boundary.

5 Claims, 2 Drawing Sheets

TUNA BUTCHERING METHOD

FIELD OF THE INVENTION

This invention relates to the commercial butchering of tuna fish and more particularly to an automated method and system for separating the edible loin portions from waste portions.

BACKGROUND OF THE INVENTION

Commercial tuna processing remains an essentially manual process in which a multiplicity of individual hand operations are required to separate the edible loin portions of tuna fish from the waste meat and skeletal structure. Such mechanization which has occurred in the industry has been with respect to improved refrigeration, machinery for conveying the fish or its constituents during the processing operation, and machinery for packing the meat into cans.

In the usual processing of tuna for canning purposes, the fish is precooked and is then cooled and routed to work tables for manual manipulation and cleaning. The head and tail are removed and the skin and fins are scraped off, after which the tuna is split longitudinally and the backbone removed. Each half of the split tuna is again longitudinally split to form a pair of discrete dorsal loins (the right and left epaxial muscles), and a pair of discrete ventral loins (the right and left hypaxial muscles). The blood meat and associated dark meat portions are scraped away from the edible loin portions, and the remaining loins, edible flakes and waste products are routed to separate processing stations for further operations to provide respective products. Each of the steps of the processing sequence outlined above is essentially manual in character, and the rate at which the tuna is processed and the quality of the resulting work is quite variable depending upon the skill of the individual worker.

Significantly improved tuna butchering techniques are the subject of U.S. Pat. Nos. 3,593,370 and 3,594,191 of J. M. Lapeyre, and which are assigned to the assignee of the present invention. In the novel methods of the foregoing patents, the tuna is subdivided in its frozen state into a plurality of cross sectional or transverse slices, and the edible loin portions are then separated from the waste meat and bone portions of each slice. The butchering of the tuna is preferably accomplished before any cooking operation. The edible loin portions are cooked separately from the waste products, and as a result, staining of the meat is avoided, thereby improving the yield of canned meat. Such staining of the edible meat can and usually does occur in the conventional processing of tuna, since the entire fish is precooked prior to butchering.

The separation of the edible loin portions in each transverse tuna slice can be accomplished manually or by use of suitably configured dies. The dies are typically of quadrant shape and are sized in accordance with the physical characteristics of the tuna slices, which are usually presorted to provide more uniformly sized slices for cutting at a particular work station. The cutting dies are of fixed size and configuration, while necessarily the edible loins of the tuna slices are of variable aspect. As a result, the edible loin portions are imperfectly separated in that some of the edible meat may not be cut by the die, or the separated loin may include some amount of waste meat.

A butchering technique and means for separation of the edible loin portions of tuna slices from associated waste portions along the actual boundary of the edible loins of slices being butchered, rather than along a boundary presumed for particular slices, is the subject of U.S. Pat. No. 3,800,363, of the same inventor and assignee as herein. In the method and system of U.S. Pat. No. 3,800,363, each transverse slice of the principal loin bearing section of a tuna is scanned to produce electrical signals representative of the boundary between the edible loin portions and the contigous waste meat portions. Control signals are derived from these electrical signals for control of cutting apparatus for precise separation of the edible loin portions along the detected boundary.

For purposes of this application, the term "tuna" will, because of conventional usage within the boundary, be considered to include the following species of fish: albacore (*Germo alalunga*), bluefin (*Thunnus thynnus*), skipjack (*Katsuwonus pelamis*), yellowfin (*Neo-thunnus macropterus*), little tuna (*Ethynnus alletteratus*), Atlantic bonito (*Sarda sarda*), Pacific bonito (*Sarda chiliensis*), and yellowtail (*Seriola dorsalis*).

The individual five species identified immediately above are recognized as species of tuna, the bonito and yellowtail being "tuna-like" fish as they are commercially canned tuna-style, although such canned fish cannot be domestically labeled as "tuna".

SUMMARY OF THE INVENTION

The automated butchering method and system of the present invention is related to the method and system of the aforesaid U.S. Pat. No. 3,800,363 and is adapted to the butchering of thawed or cooked transverse tuna slices.

In practicing the invention, a whole tuna which is wholly or partially frozen is subdivided by cutting the loin-bearing portion thereof into a plurality of discrete transverse slices of predetermined thickness. The viscera of each frozen transverse slice is removed from the visceral cavity in the frozen state by forcing the viscera out through the larger end of the cavity, such as by a suitably configured plunger. The skin is peeled away by thawing the circumferential surface of the fronzen slice to permit peeling of the pliant skin from the otherwise frozen slice. Alternatively, the skin can be abraded from the frozen slice, or cut from the frozen slice. The transverse slices, after evisceration and peeling, are conveyed to apparatus for thawing or cooking. Typically, thawing or cooking is accomplished in a steam box or a water bath through which the slices are transported by appropriate conveyor apparatus. The slices which have been thawed or cooked are then conveyed to apparatus operative to view or scan a surface of the slice. The boundary of the edible loin portions of each transverse tuna slice is determined by viewing or scanning a surface of the slice to provide a signal indication which differs for the loin portions, and the waste meat portions. In alternative embodiment, the frozen slices are thawed or cooked prior to removal of the viscera and/or skin.

Many different viewing or scanning instrumentalities can be employed according to the invention to provide the signals indicative of the edible loin boundaries. Scanning of the transverse tuna slice can be accomplished, for example, by mechanical means whereby a slice is moved relative to a sensor to provide the delineating signals. Usually, the sensor is stationary while the tuna slice is caused to move past the sensing station. Another form of scanner employs electronic or optical scanning wherein a beam of light or other suitable radiant energy is caused to traverse the tuna slice along a predetermined path to provide the intended output signals. The resulting signals can be subsequently employed to control the movement of cutting apparatus for separation of the edible loins from the remainder of the slice. The invention also comprehends the scanning of both surfaces of a tuna slice to provide signal indications of the loin boundaries of the respective surfaces for use in adjusting the cutting angle of the cutting apparatus to follow the loin boundaries which can be tapered through the slice by reason of anatomical configuration.

The bone structure of a tuna slice cannot usually be differentiated from the associated edible loins by optical scanning techniques; however, the position of the bone structure is readily determined by virtue of the bilateral symmetry of the transverse slice and the central location of the structure. In alternative embodiment, the transverse tuna slice can be cut along planes parallel to the neural spines of the skeletal structure to provide right and left halves of a transverse slice. Each half of the slice can then have the edible loins separated therefrom along the delineated boundary with the blood meat portions.

DESCRIPTION OF THE DRAWINGS

The invention will be more fully understood from the following detailed description taken in conjunction with the accompanying drawings, in which.

DETAILED DESCRIPTION OF THE INVENTION

Figure 1:
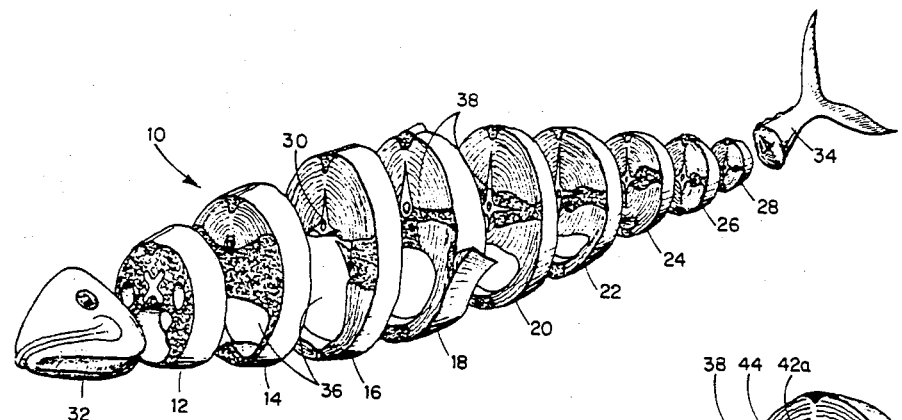
FIG. 1 is a perspective view of a frozen tuna which has been divided into a number of transverse slices.

For butchering according to the invention, a tuna which is in fronzen or substantially frozen condition is subdivided into a plurality of discrete lateral or transverse slices as described in the above-noted U.S. Pat. Nos. 3,593,370 and 3,594,191. As shown in FIG. 1, the loin-bearing portion of a tuna 10 is divided into a plurality of transverse slices, such as slices 12 through 28 shown, by cutting the loin-bearing portion along axes generally transverse to the longitudinal spine or backbone 30. The head portion 32 and tail portion 34 are removed for separate processing, and the transverse or lateral slices of the loin-bearing portion are of a form which markedly facilitates the butchering and subsequent processing of tuna by automated techniques according to the invention. The slices are preferably of uniform thickness and of a thickness suitable to the type and size of pack for which the tuna is intended.

It will be appreciated that the tuna slices are bilaterally symmetrical about a dorsal to ventral plane, which permits individual slices obtained from different tuna to be sorted into predetermined groupings according to the general internal anatomical characteristics, to thereby facilitate subsequent processing. The diametric size and anatomical characteristics of individual slices for a particular tuna will vary in accordance with the location from which the slice is derived and the size and specie of the particular tuna. As seen in FIG. 1, both the visceral cavity 36 and the blood meat portions 38 vary in size and cross sectional configuration according to the location within the tuna of the particular slice.

Figure 2:
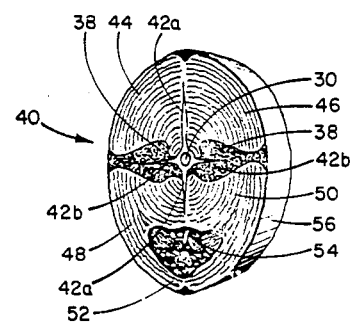
FIG. 2 is a perspective view of a typical transverse tuna slice for butchering according to the invention.

A typical tuna slice 40 to be butchered according to the invention is depicted in FIG. 2 and includes a centrally located and axially disposed portion of the spine or backbone 30 having neural spines 42a extending upwardly and downwardly, and the epicentral ribs 42b extending laterally therefrom. The right and left epaxial muscle portions 44 and 46 and the right and left hypaxial muscle portions 48 and 50 constitute, respectively, the edible dorsal loins and edible ventral loins. The dorsal and ventral loin portions are at least partially separated by lateral extending blood meat portions 38. The ventral portions also merge into a relatively thin belly meat portion 52 surrounding the visceral cavity 54. By operation of the invention, these edible loin portions are accurately delineated from the associated waste meat portions and cut therefrom to provide efficiently removed edible meat which is then cooked and packed for canning.

The surface reflectivity of the transverse tuna slice is sufficiently different for the edible loin portions and for the waste meat portions thereof to permit delineation of the edible loins by optical scanning techniques. Specific reflectivities will, of course, depend upon the surface characteristics of a particular slice, but in general, the reflectivity of loin portions 44, 46, 48, and 50 is approximately twice that of blood meat portions 38, viscera 54, and surrounding skin 56. The boundary separating the lighter edible meat from the surrounding darker waste meat is quite sharp, which allows extremely precise delineation of the edible loin portions. Partial or complete cooking of the slice usually enhances the contrast between the edible meat and the waste meat.

Figure 3:
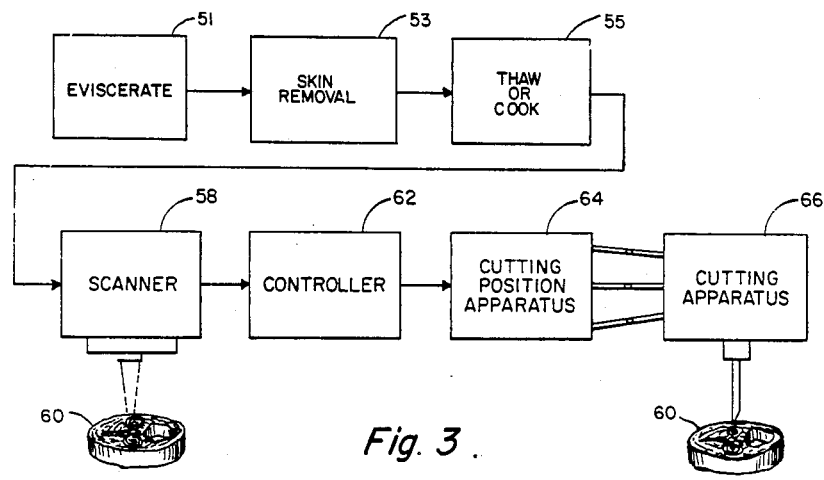
FIG. 3 is a block diagram representation of a system for butchering tuna according to the invention.

A system and method for butchering the tuna slices is shown in FIG. 3. The frozen slices are conveyed to a station 51 at which the viscera are removed from the visceral cavity of the slice. The viscera is pushed or forced out through the larger end of the visceral cavity by a suitably configured plunger conforming to the general cross-sectional area of the smaller end of the cavity. The viscera also exhibits a lower reflectivity than the edible loin portions and can also be delineated during a scanning operation and can alternatively be removed from the tuna slice by cutting. In the frozen state, however, it is not usually necessary to remove the viscera by cutting, as the viscera can be more simply removed by forcing it out through the visceral cavity. The tuna slice is then moved to a station 53 at which the skin is removed from the slice. Peeling can be accomplished by thawing the circumferential surface of the slice to render the skin pliable to a degree sufficient to permit its removal from the otherwise frozen slice. Alternatively, the skin can be abraded from the frozen slice prior to thawing or cooking, such as by use of an abrasive drum or belt. As a further alternative, the skin can be delineated during a scanning operation and can be cut from the slice. It is recognized that the order in which the evisceration and skinning is performed is not critical. Alternatively, the skinning operation may be performed prior to evisceration, or the viscera and/or skin can be removed from the slice after thawing or cooking of the slice. In a thawed or cooked slice, the viscera can, for example, be washed from the visceral cavity by water flow.

The tuna slice is conveyed to a station 55 where the slice is thawed or partially or wholly cooked. In the cooked state, the reflectivity of the edible loin and waste meat portions is usually increased, with the result that scanning signal levels of increased magnitude can be produced. Such increased signal levels are often advantageous in enhancing the performance of the associated sensors and can permit the use of certain types of sensors which require relatively high signal levels for proper performance. Cooking of many species of tuna also results in greater contrast between the edible loin and waste meat portions, with the result that the boundary of the edible loin portions can be more readily distinguished.

The thawed or cooked slices are next conveyed to a scanner 58 operative to scan the surface of a tuna slice 60 and to provide output signals indicative of the reflectance characteristics of the surface being scanned and from which is derived a signal representation of the boundary between the edible loins and the waste meat portions. The output signals of scanner 58 are applied to a contoller 62 which provides control signals to cutting position apparatus 64 operative to control the position of cutting apparatus 66 relative to slice 60 being butchered. The scanner 58 can take a variety of forms which per se are known in the art of optical character recognition and mark sensing. For purposes of illustration, several categories of scanners will be briefly described below as examples of instrumentalities which can be employed according to the invention to provide novel tuna butchering.

It is recognized that the invention can vary in its mode of practice to suit the particular types of tuna or tuna-like fish to be butchered. In some instances it may be desirable to thaw or cook the transverse slice prior to evisceration and skinning, and to scan the surface of the thawed or cooked slice to delineate the boundaries between the edible loin portions and the waste meat portions including the blood meat, skin, and viscera. All of the waste meat portions including the bloood meat, skin, and viscera can then be cut from the slice in accordance with the detected boundaries. As a further alternative, the tuna slice may be eviscerated in its frozen state, and the skin removed after thawing or cooking of the slice. Or the skin may be removed from a frozen slice, and the viscera removed after thawing or cooking.

Figure 4:
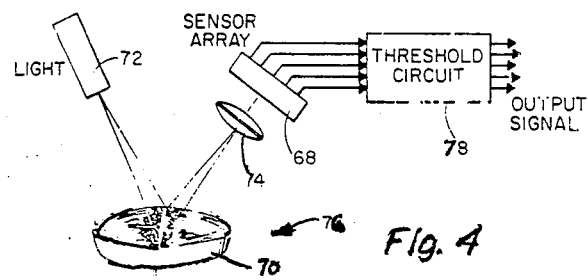
FIG. 4 is a diagrammatic representation of a scanning system useful according to the invention.

One form of scanner is depicted in FIG. 4 and includes an elongated photosensor array 68 arranged to receive light reflected from the surface of a tuna slice 70 and provided by a light source 72. The light source provides an elongated narrow beam of light which extends across slice 70, reflected light being directed to sensor 67 by lens system 74. The slice 70 is caused to move along an axis generally othogonal to the axis of the impinging light beam, as shown by arrow 76, such that the surface of slice 70 is scanned to provide output signals representative of the reflectivity of the scanned surface. The electrical signals provided by sensor array 68 will be of varying magnitude in accordance with the varying reflectivity of the slice surface being scanned. These electrical signals are usually processed by a threshold circuit 78 which provides a threshold level above which signals are presumed to be representative of the lighter edible loin portions and below which the signals are presumed to be representative of the relatively darker waste meat portions. The threshold circuit therefore provides an array of electrical signals of first or second digital value representing the edible loin and waste meat portions of the scanned tuna slice surface. These signals are then subsequently processed to provide control signals for associated cutting apparatus. The transformation of the scanner output signals into control signals for the cutting apparatus can be accomplished by means and techniques well known in the electronics art and can include, for example, a special purpose electronic controller or a suitably programmed computer to provide cutting control signals.

Figure 5:
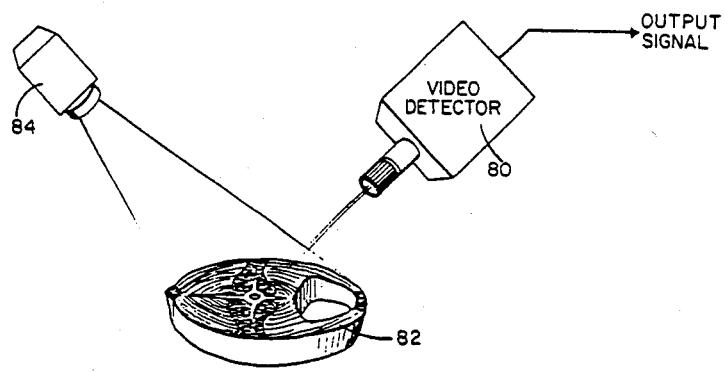
FIG. 5 is a diagrammatic representation of a further alternative scanning system useful according to the invention.

A second embodiment of a scanner useful in the invention is shown in FIG. 5 wherein a video detector 80, such as a television camera or flying spot scanner, is disposed to view the surface of a tuna slice 82 and to provide electrical output signals representative of the surface characteristics thereof for delineation of the edible loin portions, as discussed. A light source 84 is provided to illuminate the surface being scanned, and video detector 80 is operative to electronically scan the surface of the tuna slice in a predetermined path to produce corresponding electrical signals representative of the reflectivity of the scanned path. The electrical output signals from detector 80 can then be processed as described to control operation of a cutting tool. In this embodiment, relative motion between the tuna slice and the detector is not required, as scanning is accomplished by electronic movement of an electron beam within the detector. Scanning of a stationary tuna slice can also be accomplished by optical means wherein a light beam is caused to traverse the surface of the slice in a predetermined path by means of movable scanning mirrors.

Figure 6:
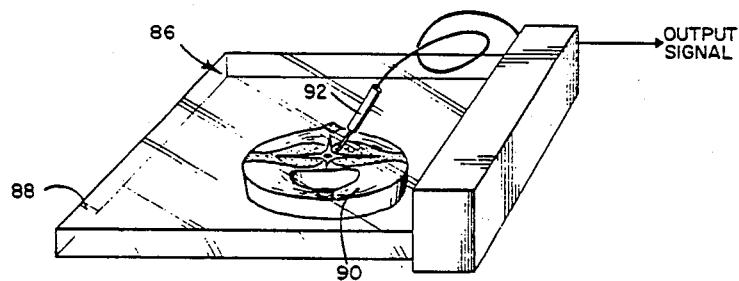
FIG. 6 is a diagrammatic representation of a further alternative scanning system useful according to the invention.

Scanning of the tuna slice can also be accomplished manually such as shown in FIG. 6. A graphic data input tablet 86 includes a transparent plate 88 which is positioned over a slice 90 to be sanned. Such data input tablets are per se known and are operative to provide output signals representative of the position of a stylus 92 which is manually movable about the surface of plate 88. An operator can manually move stylus 92 along the boundary of the edible loin portions of slice 90 to provide electrical output signals representative of this boundary and which can be employed to operate cutting apparatus as described above. For a more fully automated system, however, the automatic scanning techniques such as those described above are preferable, since no operator need be interposed to accomplish delineation of the edible loins.

The cutting apparatus for cutting the edible loin portions along the predetermined boundaries is preferably a high-pressure water jet cutter. The thawed or cooked tuna slice can be cut more easily and faster than a frozen slice with a water jet cutter operating at substantially lower pressure than that required to cut through a frozen tuna slice. A water jet cutter typically operates at a pressure of about 30,000 to 75,000 psi and employs a jet of about 0.005 to 0.015 inch diameter for cutting through a frozen slice. For a thawed or cooked slice, a water jet cutter can operate at substantially lower pressure for the same cutting speed as for a frozen slice. Such water jet cutters typically operate at a rate of 300 inches per minute and offer the major advantage of providing precision cutting without contact by a cutting tool.

The water jet cutter is typically mounted in a movable head which is capable of movement along mutually orthogonal axes such that the cutting head can be controlled by rectangular coordinate driving signals to position the cutting head and cause it to follow a path along the predetermined boundary of the edible loin portions of the tuna slice. Other cutting apparatus can also be employed as desired, such as a knife blade or ultrasonic cutter.

Figure 7:
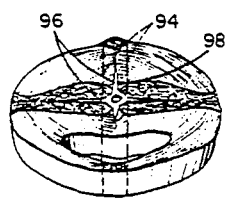
FIG. 7 is a perspective view of a transverse tuna slice illustrating a butchering step of the invention.
Figure 8:
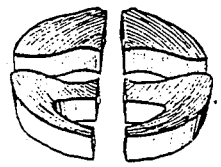
FIG. 8 is a perspective view of the edible loin portions separated from a transverse slice according to the invention.

The skeletal structure of the tuna is not readily discernible by optical scanning techniques; however, the position of this structure can be readily determined by reason of the bilateral symmetry of the anatomical configuration of the transvere slice and the central disposition of the skeletal structure. The neural spines which generally separate the right and left loin portions are disposed along an axis which substantially bisects the slice. The neural spine position can thus be ascertained by determining the center line of the blood meat portions which are delineated by scanning of the slice, as described. Removal of the edible loin portions from the associated bone structure can be accomplished by cutting the transverse slice along planes parallel to the neural spines, such as shown by dashed lines 94 in FIG. 7. Such a cut can be accomplished by a water jet cutter or knife blade, for example, to remove the neural spines 96 and a slight portion of contiguous meat 98. This cut can be taken either before or after scanning of the slice. If the cut is provided after scanning of the entire slice, the boundaries of the edible loin portions and the contiguous blood meat portions complete the separation of the edible loins, such as illustrated in FIG. 8. In the event that the bifurcating cut is taken prior to the scanning operation, the right and left halves of the slice are then individually scanned to delineate the edible loin portions which are then separated.

It will be appreciated that the tuna exhibits a longitudinal dissymmetry such that the blood meat portions of a transverse slice are tapered through the slice. The cutting tool for separating the edible loin portions of the slice can be angularly disposed in accordance with this taper to thereby more completely remove the edible loins from the associated blood meat portions. The angular inclination of the taper through the transverse slice, in one embodiment, can be presumed from the nature of the particular slice and the position from which it was separated from the whole tuna. Alternatively, respective opposite surfaces of the transverse slice can be scanned according to the invention to determine the exact cross sectional configuration of both surfaces of the slice, and to provide corresponding electrical signals operative to control cutting apparatus, the angular position of which can also be controlled to follow the tapered boundary of the edible loins.

Although the invention finds especial application to the butchering of tuna or tuna-like fish, it will be appreciated that the invention is also applicable to other types of fish which can be subdivided into transverse slices and which exhibit distinguishable light and dark meat portions. The invention can be practiced by a variety of instrumentalities which are individually known. For example, the particular scanning apparatus, cutting apparatus, and means for positioning transverse slices for scanning and cutting can take many different forms to suit specific requirements. Accordingly, it is not intended to limit the invention by what has been particularly shown and described, except as indicated in the appended claims.

What is claimed is:

1. The method of butchering tuna which is in a frozen condition comprising the steps of:

cutting the loin bearing portion of said tuna along planes approximately normal to the major skeletal axis thereof into a plurality of discrete bilaterally symmetrical frozen slices having predetermined thicknesses;

removing the viscera of each frozen slice from the visceral cavity thereof;

removing the skin of each frozen slice;

cooking each frozen slice to heighten contrast between edible and waste portions of the slice; and scanning at least one surface of each cooked slice to produce electrical signals representative of the boundary between the edible loin portions thereof and the waste portions and operative to control the movement of cutting apparatus for separating said edible loin portions.

2. The method of butchering tuna which is in a frozen condition comprising the steps of:

cutting the loin bearing portion of said tuna along planes approximately normal to the major skeletal axis thereof into a plurality of discrete bilaterally symmetrical frozen slices having predetermined thicknesses;

cooking each frozen slice to heighten contrast between edible and waste portions of the slice;

removing the viscera of each slice from the visceral cavity thereof;

removing the skin of each slice; and scanning at least one surface of each slice to produce electrical signals representative of the boundary between the edible loin portions thereof and the waste portions and operative to control the movement of cutting apparatus for separating said edible loin portions.

3. The method of butchering tuna which is in a frozen condition comprising the steps of:

cutting the loin bearing portions of said tuna along planes approximatey normal to the major skeletal axis thereof into a plurality of discrete bilaterally symmetrical frozen slices having predetermined thicknesses;

removing the viscera of each frozen slice from visceral cavity thereof;

cooking each frozen slice to heighten contrast between edible and waste portions of the slice; and scanning at least one surface of each cooked slice to produce electrical signals representative of the boundary between the edible loin portions thereof and the waste portions and operative to control the movement of cutting apparatus for separating said edible loin portions.

4. The method of claim 3 including the step of removing the skin of each slice after cooking thereof.

5. The method of butchering frozen fish which has previously been subdivided into a plurality of discrete bilaterally symmetrical transverse sections having predetermined thicknesses, comprising the steps of:

cooking each section to heighten contrast between edible and waste portions of the section;

positioning each section with respect to scanning apparatus;

scanning at least one surface of each said positioned section to produce electrical signals representative of the surface characteristics thereof; and deriving control signals representative of the boundary between the edible meat portions and the waste portions of the scanned section.

* * * * *